United States Patent
Shin et al.

(10) Patent No.: US 12,454,309 B2
(45) Date of Patent: Oct. 28, 2025

(54) HYDRAULIC ACOUSTIC ATTENUATOR OF AGRICULTURAL TRACTOR

(71) Applicant: LS MTRON LTD., Anyang-si (KR)

(72) Inventors: Jaiyoon Shin, Anyang-si (KR); Junguk Lee, Anyang-si (KR); Hanjoon Cho, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 43 days.

(21) Appl. No.: 18/611,191

(22) Filed: Mar. 20, 2024

(65) Prior Publication Data

US 2024/0317302 A1 Sep. 26, 2024

(30) Foreign Application Priority Data

Mar. 21, 2023 (KR) .................. 10-2023-0036694

(51) Int. Cl.
*B62D 5/06* (2006.01)
*B62D 7/22* (2006.01)
*F16L 55/04* (2006.01)

(52) U.S. Cl.
CPC .............. *B62D 5/062* (2013.01); *B62D 7/22* (2013.01); *F16L 55/04* (2013.01)

(58) Field of Classification Search
CPC ............ B62D 5/062; B62D 7/22; F16L 55/04
See application file for complete search history.

(56) References Cited

U.S. PATENT DOCUMENTS

| | | | | |
|---|---|---|---|---|
| 3,620,321 A | * | 11/1971 | Thibodeau | B62D 7/14 180/41 |
| 4,244,441 A | | 1/1981 | Tolman | |
| 5,172,729 A | * | 12/1992 | Vantellini | F16L 55/04 181/255 |

FOREIGN PATENT DOCUMENTS

| | | |
|---|---|---|
| CN | 202314809 U | 7/2012 |
| CN | 207529653 U | 6/2018 |
| JP | 2012141056 A | 7/2012 |
| KR | 100742506 B1 | 7/2007 |

* cited by examiner

*Primary Examiner* — Jacob M Amick
(74) *Attorney, Agent, or Firm* — K&L Gates LLP

(57) ABSTRACT

Disclosed herein is a hydraulic acoustic attenuator for an agricultural tractor. The hydraulic acoustic attenuator includes: a first cylinder provided in a hydraulic line, and configured to provide a passage through which oil passes; a second cylinder configured to accommodate the first cylinder and to form a resonance chamber between the first cylinder and itself; and coupling members configured to couple both ends of the first cylinder and both ends of second cylinders to one another, respectively. The first cylinder has one or more communication holes that allow the passage and the resonance chamber to communicate with each other. The diameter of the communication holes has a range larger than 0.0 mm and equal to or smaller than 1.5 mm.

7 Claims, 3 Drawing Sheets

HYDRAULIC ACOUSTIC ATTENUATOR OF AGRICULTURAL TRACTOR

CROSS-REFERENCE TO RELATED APPLICATION

This application claims the benefit of Korean Patent Application No. 10-2023-0036694 filed on Mar. 21, 2023, which is hereby incorporated by reference herein in its entirety.

FIELD

The present disclosure relates to an acoustic attenuator that can be used in an agricultural tractor, and more particularly to a hydraulic acoustic attenuator that is installed in a hydraulic line.

BACKGROUND

Agricultural tractors are work machines (or work vehicles) that are used for performing various agricultural tasks with work tools having different functions attached thereto and detached therefrom.

Agricultural tractors move forward and backward using the power generated by a power generator (mainly an internal combustion engine) like ordinary cars, so that they need to be equipped with a steering device configured to change the direction of movement.

Generally, a steering device includes a steering handle and a steering unit.

The steering unit is implemented to change the direction of a steering wheel by converting the rotational force of the steering handle, operated by a driver, into linear moving force.

Since the main area of use of agricultural tractors is a work space, the states in which the steering wheel and a ground surface are in contact with each other are considerably uneven. This makes it difficult for a driver to operate the steering handle. Accordingly, the steering unit requires a mechanism that adds additional assistive force when a driver wants to rotate the steering handle.

Unlike ordinary cars, agricultural tractors mainly use hydraulic power as auxiliary force. In this case, since a hydraulic pump is operated to apply auxiliary force to the steering unit, a hydraulic line needs to be provided between the hydraulic pump and the steering unit.

Typically, the steering unit is disposed inside the passenger space of a cabin, and the hydraulic pump is disposed on an engine or transmission side. Furthermore, the hydraulic line connects the hydraulic pump and the steering unit to take charge of the movement of working oil between the hydraulic pump and the steering unit.

However, the vibration noise generated from the hydraulic line is transmitted directly to a driver in the cabin through the steering unit and the steering handle.

To reduce the vibration noise generated from the hydraulic line, it may be contemplated that an acoustic attenuator is installed.

An expansion-type acoustic attenuator has a structure in which a portion of a pipe is expanded.

However, the expansion-type acoustic attenuator causes new noise due to the generation of vortices resulting from an increase in flow resistance when the diameter of the pipe is small compared to the flow rate and thus the oil speed is considerably high.

In addition, it is considerably difficult to install the expansion-type acoustic attenuator in the hydraulic line of a steering system in which it is difficult to secure a space because the installation space is large compared to the noise reduction effect. Meanwhile, when the degree of expansion is reduced to accommodate a narrow space, there is no practical noise reduction effect due to new noise generated by vortices, etc.

Meanwhile, an acoustic attenuator having an insertion tube structure using the Helmholtz resonance principle can be considered. The acoustic attenuator having an insertion tube structure can take up a small installation space. However, even in this case, communication holes that allow a passage, through which oil passes, and a resonance chamber to communicate with each other are large, so that noise may be caused due to the generation of vortices.

Therefore, there have been technical proposals to place a steering unit as far away from a driver as possible instead of installing an acoustic attenuator in a hydraulic line spanning from a hydraulic pump to a steering unit. However, even in this case, there are limitations to reducing the noise generated in a hydraulic line.

SUMMARY

The present disclosure has been conceived from concerns about an acoustic attenuator that can minimize the noise caused by the generation of vortices.

In addition, the present disclosure has been conceived from concerns about an acoustic attenuator that that can be applied to a hydraulic line between the hydraulic pump and steering unit of an agricultural tractor.

According to an aspect of the present disclosure, there is provided a hydraulic acoustic attenuator for an agricultural tractor, the hydraulic acoustic attenuator including: a first cylinder provided in a hydraulic line, and configured to provide a passage through which oil passes; a second cylinder configured to accommodate the first cylinder and to form a resonance chamber between the first cylinder and itself; and coupling members configured to couple both ends of the first cylinder and both ends of second cylinders to one another, respectively; wherein the first cylinder has one or more communication holes that allow the passage and the resonance chamber to communicate with each other; and wherein the diameter of the communication holes has a range larger than 0.0 mm and equal to or smaller than 1.5 mm.

The diameter of the communication holes may be 1.5 mm.

The number of the communication holes may be determined by the following equation:

$$n = \frac{S_t}{s}$$

where $S_t$ denotes a total communication area between the first and second cylinders that can be determined by the specifications of the acoustic attenuator and the frequency of noise to be reduced, and s denotes the sectional area of one of the communication holes.

The hydraulic acoustic attenuator may further include joints configured to connect both ends of the first cylinder with a hydraulic line.

The hydraulic line may be disposed between a hydraulic pump and a steering unit.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

Embodiments of the present disclosure will be described with reference to the accompanying drawings. For brevity of description, descriptions of well-known or redundant components will be omitted or abridged as much as possible.

Figure 1:
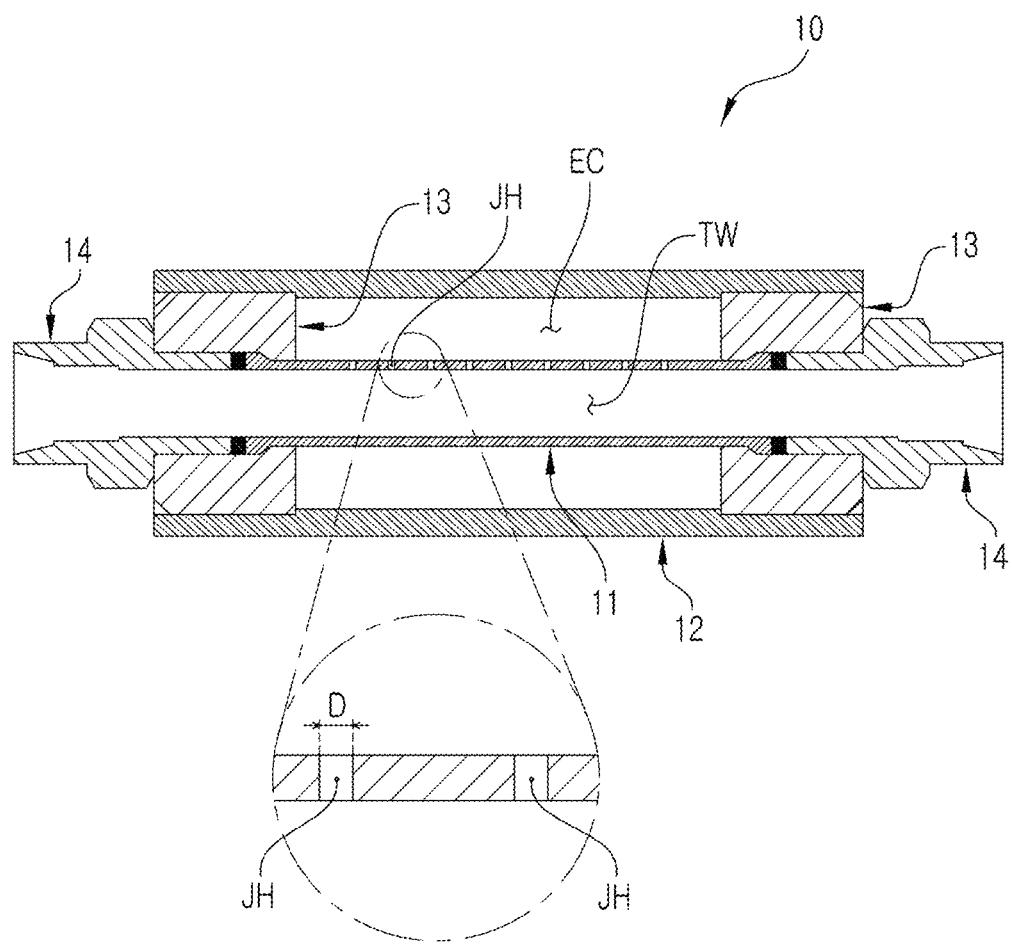
FIG. 1 is a schematic sectional view of a hydraulic acoustic attenuator for an agricultural tractor according to an embodiment of the present disclosure.

FIG. 1 is a schematic sectional view of a hydraulic acoustic attenuator 10 for an agricultural tractor (hereinafter abbreviated as the "hydraulic acoustic attenuator") according to an embodiment of the present disclosure.

The hydraulic acoustic attenuator 10 includes a first cylinder 11, a second cylinder 12, coupling members 13, and joints 14.

The first cylinder 11 provides a passage TW through which oil passes.

The first cylinder 11 is disposed inside the second cylinder 12.

The second cylinder 12 accommodates the first cylinder 11. Furthermore, the second cylinder 12 forms a resonance chamber EC between the first cylinder 11 and itself 12.

The coupling members 13 couple both ends of the first cylinder 11 and both ends of the second cylinder 12 to each other, respectively.

The coupling members 13 couple the first and second cylinders 11 and 12 to be spaced apart from each other at all points in the circumferential direction.

Furthermore, a space obtained by spacing the first and second cylinders 11 and 12 apart from each other forms the resonance chamber EC.

The joints 14 connect both ends of the first cylinder 11 to a hydraulic line.

Figure 2:
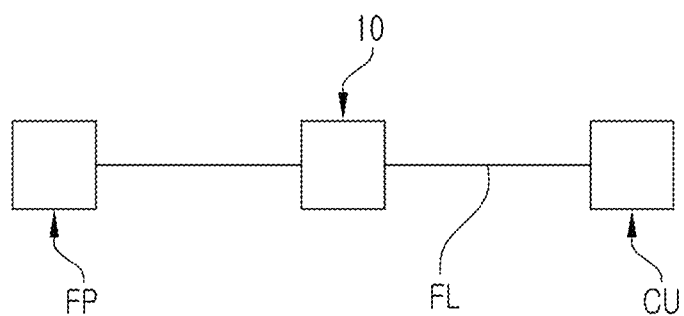
FIG. 2 is a reference diagram illustrating the location where the hydraulic acoustic attenuator of FIG. 1 is disposed.

For example, as shown in FIG. 2, the hydraulic acoustic attenuator 10 according to the present disclosure may be disposed and connected by the joints 14 in a hydraulic line FL between a hydraulic pump FP and a steering unit CU.

Although the joints 14 may be components of the hydraulic acoustic attenuator 10, they may be constructed on the hydraulic line FL.

Meanwhile, the first cylinder 11 has a plurality of communication holes JH that allow the passage TW and the resonance chamber EC to communicate with each other.

As the diameter D of the communication holes JH is smaller, the performance thereof becomes better.

When the diameter D of the communication holes JH is small, a noise removal effect may be maintained without change, but the generation of vortices may be suppressed, compared to the case where the diameter D is large.

In addition, when the diameter D of the communication holes JH is small, a change in the diameter D of the hydraulic line FL is small, so that the pressure drop attributable to the installation of the hydraulic acoustic attenuator 10 can be minimized.

According to the present disclosure, it is contemplated that the diameter D of the communicating holes JH has a range larger than 0.0 mm but is equal to or smaller than 1.5 mm. However, when the wall thickness of the first cylinder 11, which needs to withstand high hydraulic pressure, is taken into consideration, it is necessary to consider machinability for the diameter D of the communication holes JH. Accordingly, it may be most desirable to contemplate that the diameter D of the communication holes JH is implemented to be 1.5 mm.

In general, the communication area between the passage TW and the resonance chamber EC may be determined by the specifications of the hydraulic acoustic attenuator 10, the frequency of the noise to be reduced, and/or the like.

In general, the performance of the acoustic attenuator may be determined by the size of transmission loss TL. When the transmission loss is large, the performance of the acoustic attenuator is excellent. In contrast, when the transmission loss is small, the performance of the acoustic attenuator is poor.

When the double cylinders 11 and 12 according to the present disclosure are applied, the transmission loss TL may be determined by Equation 1 below:

$$TL = 10\log\left|1 + \left(\frac{\frac{\sqrt{GV}}{2S_0}}{\frac{f}{f_r} - \frac{f_r}{f}}\right)^2\right| \quad (1)$$

In Equation 1, G may be determined by Equation 2 below:

$$G = \frac{S_t}{t + 1.6a} \quad (2)$$

In Equation 1, $f_r$ may be determined by Equation 3 below:

$$f_r = \frac{C}{2\pi}\sqrt{\frac{G}{V}} \quad (3)$$

Furthermore, in Equations 1, 2, and 3, V denotes the volume of the resonance chamber EC, $S_0$ denotes the sectional area of the passage TW of the first cylinder 11 when it is cut in a direction perpendicular to the direction in which oil passes, f denotes the frequency of the noise to be reduced, $S_t$ denotes the total communication area between the passage TW and the resonance chamber EC, a denotes the radius of the communication holes JH having an area equal to the total communication area, t denotes the wall thickness of the first cylinder 11, and C denotes the speed of sound.

Referring to Equations 1 to 3 above, it can be seen that the total communication area $S_t$ can be determined by the volume V of the resonance chamber EC, the sectional area $S_0$ of the passage, the frequency f of the noise to be reduced, and the wall thickness t of the first cylinder 11.

Accordingly, by determining the frequency f of the noise to be reduced and the value of the required transmission loss TL and using the relations of Equations 1 to 3, the total communication area $S_t$ can be found.

In addition, by dividing the total communication area $S_t$ by the sectional area s of one communication hole JH to be formed according to Equation 4 below, the number n of communication holes JH to be formed can be found.

$$n = \frac{S_t}{s} \quad (4)$$

It is obvious that, since a can be found from the relations of Equations 1 to 3 above, the total communication area $S_t$ can be found using the relationship between the total communication area $S_t$ and a.

The noise reduction performance according to the application of the present disclosure will be described below.

Figure 3:
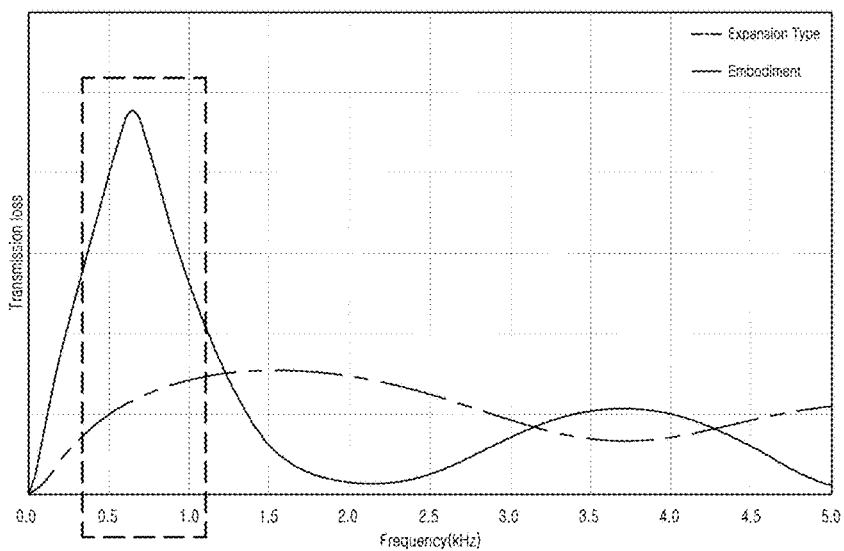
FIG. 3 is a graph comparing the hydraulic acoustic attenuator of FIG. 1 and an expansion-type acoustic attenuator.

FIG. 3 shows comparisons between the case where the hydraulic acoustic attenuator 10 according to the present disclosure is installed and the case where the expansion-type acoustic attenuator is installed.

It can be seen that, when transmission losses in noise in the 0.5 kHz to 1.0 kHz band are compared, noise is significantly reduced when the hydraulic acoustic attenuator 10 according to the present disclosure is applied compared to when the expansion-type acoustic attenuator is applied.

In the graph of FIG. 3, the frequency band having large transmission loss may be shifted through tuning based on the relations specified in Equations 1 to 3. In other words, it may be possible to fabricate a hydraulic acoustic attenuator 10, suitable for a noise band generated in a specific hydraulic line, through tuning.

Figure 4:
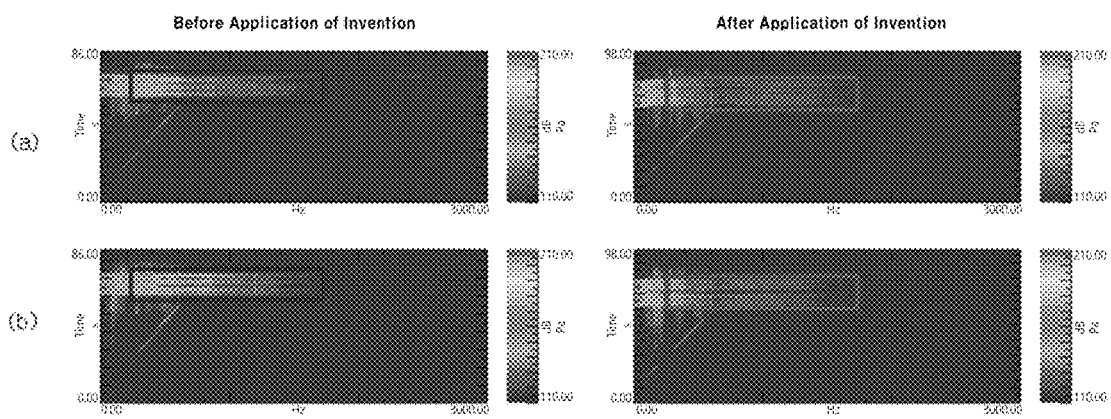
FIGS. 4 to 6 are reference diagrams illustrating the performance of the hydraulic acoustic attenuator according to the present disclosure.

FIG. 4 shows the magnitudes of vibration before and after the hydraulic acoustic attenuator 10 according to the present disclosure was applied.

For reference, since the magnitude of vibration is almost proportional to the magnitude of noise, the magnitude of vibration was measured using an indirect method for measuring noise.

In the graph of FIG. 4, the magnitude of vibration increases in the direction from dark blue to red.

FIG. 4(a) shows, when the driving direction was changed to the right, changes in the magnitude of vibration before the application of the present disclosure and changes in the magnitude of vibration after the application of the present disclosure, and FIG. 4(b) shows, when the driving direction was changed to the left, changes in the magnitude of vibration before the application of the present disclosure and changes in the magnitude of vibration after the application of the present disclosure.

In both FIGS. 4(a) and 4(b), it can be seen that the magnitude of vibration was reduced when the present disclosure was applied.

Figure 5:
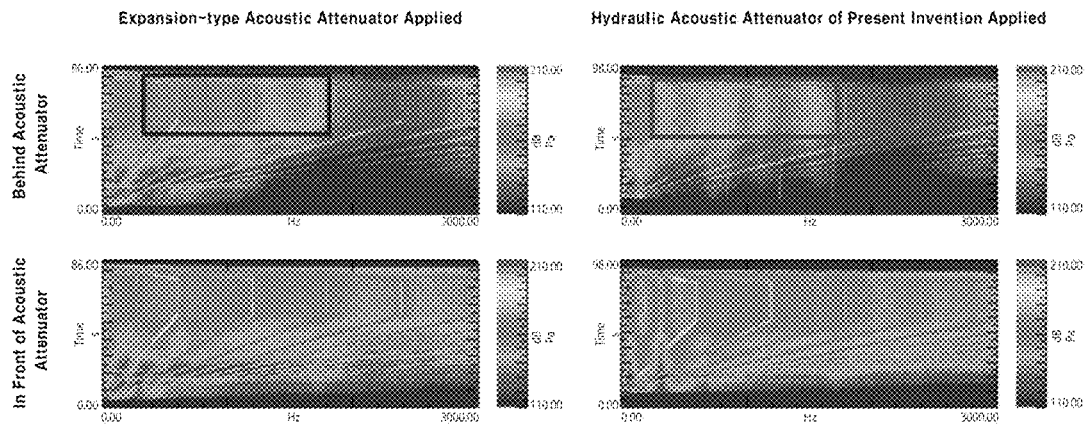

FIG. 5 shows, when the expansion-type acoustic attenuator having the same external size was applied and when the hydraulic acoustic attenuator 10 according to the present disclosure was applied, the magnitudes of vibration in front of and behind the acoustic attenuators.

In front of the acoustic attenuators, there was no significant difference between the magnitude of vibration when the expansion-type acoustic attenuator was installed and the magnitude of vibration when the hydraulic acoustic attenuator 10 according to the present disclosure was installed.

In contrast, it can be seen that behind the acoustic attenuators, the magnitude of vibration when the hydraulic acoustic attenuator 10 according to the present disclosure was installed was significantly reduced compared to the magnitude of vibration when the expansion-type acoustic attenuator was installed.

Figure 6:
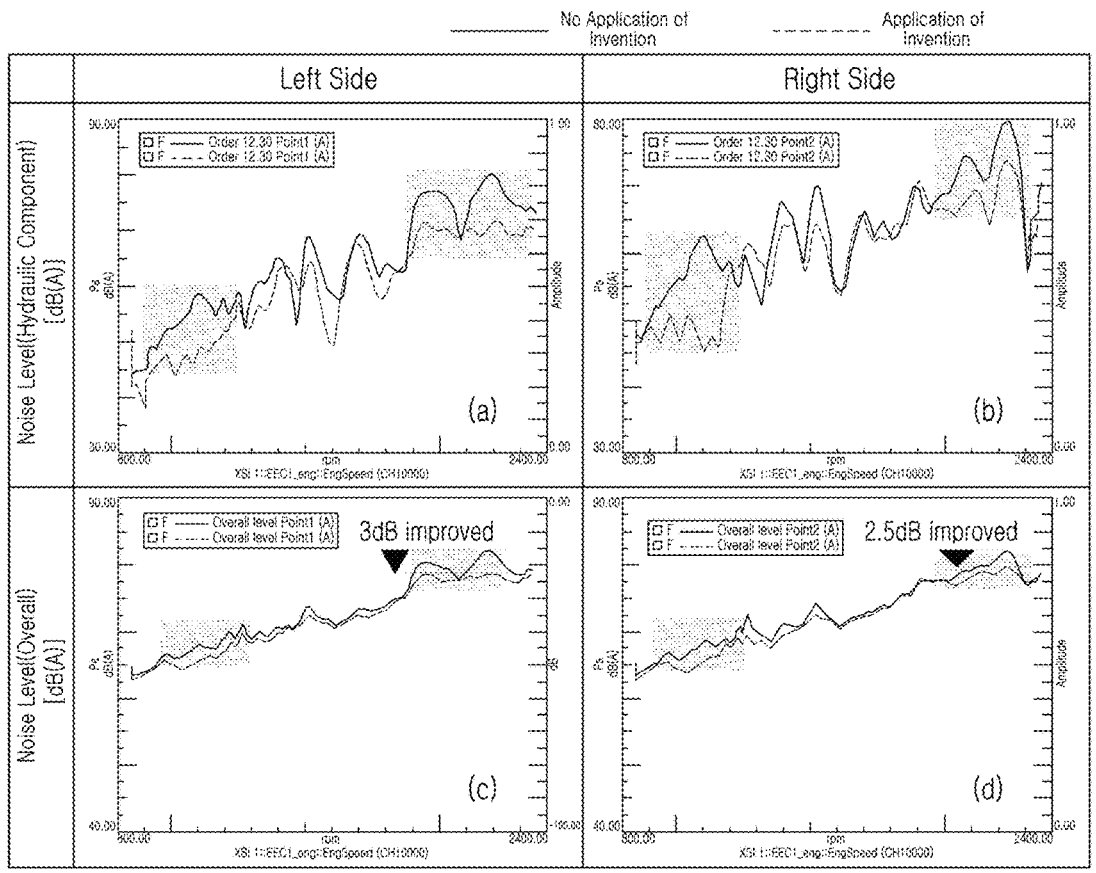

FIG. 6 is a graph showing the perceived noise felt by a driver's left ear and the perceived noise felt by the driver's right ear.

FIGS. 6(a) and 6(b) show the noise extracted from the noise felt by the driver and generated by the hydraulic component, and FIGS. 6(c) and 6(d) show the total noise felt by the driver.

In any case, it can be determined that perceived noise was reduced when the hydraulic acoustic attenuator 10 according to the present disclosure was applied.

Meanwhile, the hydraulic acoustic attenuator 10 according to the above description may be installed in a hydraulic line between a hydraulic pump and an actuator operated by hydraulic pressure. In particular, when the hydraulic acoustic attenuator 10 is installed in the hydraulic line FL between the hydraulic pump FP and the steering unit CU for which it is difficult to apply the expansion-type acoustic attenuator, the hydraulic noise traveling from the steering unit CU to a driver along a steering shaft is reduced, so that a more comfortable driving environment can be generated.

According to the present disclosure, the diameter of the communication holes is small, so that the communication area is maintained while the generation of vortices is suppressed, thereby providing the advantages of reducing noise and minimizing installation space.

In particular, when the hydraulic acoustic attenuator according to the present disclosure is installed in the hydraulic line between the hydraulic pump and the steering unit, it can provide a driver with a comfortable driving environment having reduced noise.

The above-described embodiments are described merely as examples of the present disclosure, and may have various application forms. Accordingly, the present disclosure should not be understood as limited to the content described above. Instead, the scope of rights of the present disclosure should be understood as the range of the attached claims and their equivalents.

What is claimed is:

1. A hydraulic acoustic attenuator for reduction of noises in an agricultural tractor associated with vortices in the hydraulic acoustic attenuator, the hydraulic acoustic attenuator comprising:
   a first cylinder provided in a hydraulic line, and configured to provide a passage through which oil passes;
   a second cylinder configured to accommodate the first cylinder and to form a resonance chamber between the first cylinder and itself;
   a first coupling member configured to couple a first end of the first cylinder to a first end of the second cylinder to fix the first end of the first cylinder to the first end of the second cylinder and disposed to completely fill a first gap between the first cylinder and the second cylinder; and
   a second coupling member configured to couple a second end of the first cylinder to a second end of the second cylinder to fix the second end of the first cylinder to the second end of the second cylinder and disposed to completely fill a second gap between the first cylinder and the second cylinder;
   wherein the first cylinder has one or more communication holes that allow the passage and the resonance chamber to communicate with each other; and
   wherein a diameter of the communication holes has a range larger than 0.0 millimeters (mm) and equal to or smaller than 1.5 mm.

2. The hydraulic acoustic attenuator of claim 1, wherein the diameter of the communication holes is 1.5 mm.

3. The hydraulic acoustic attenuator of claim 1, wherein a number n of the communication holes is determined by the following equation:

$$n = \frac{S_t}{s}$$

where $S_t$ denotes a total communication area between the first cylinder and the second cylinder determined by at least a frequency of the noises to be reduced, and s denotes a sectional area of one of the communication holes.

4. The hydraulic acoustic attenuator of claim 1, further comprising joints configured to connect the first end and the second end of the first cylinder with a hydraulic line.

5. The hydraulic acoustic attenuator of claim 1, wherein the hydraulic line is disposed between a hydraulic pump and a steering unit.

6. A hydraulic acoustic attenuator for reduction of noises in an agricultural tractor associated with vortices in the hydraulic acoustic attenuator, the hydraulic acoustic attenuator comprising:
- a first cylinder provided in a hydraulic line, and configured to provide a passage through which oil passes;
- a second cylinder configured to accommodate the first cylinder and to form a resonance chamber between the first cylinder and itself;
- a first coupling member configured to couple a first end of the first cylinder to a first end of the second cylinder; and
- a second coupling member configured to couple a second end of the first cylinder to a second end of the second cylinder;
- wherein the first cylinder has one or more communication holes that allow the passage and the resonance chamber to communicate with each other,
- wherein a diameter of the communication holes has a range larger than 0.0 millimeters (mm) and equal to or smaller than 1.5 mm,
- wherein a number n of the communication holes is determined by the following equation:

$$n = \frac{S_t}{s}$$

where $S_t$ denotes a total communication area between the first cylinder and the second cylinder determined by at least a frequency of the noises to be reduced, and s denotes a sectional area of one of the communication holes.

7. A hydraulic acoustic attenuator for reduction of noises in an agricultural tractor associated with vortices in the hydraulic acoustic attenuator, the hydraulic acoustic attenuator comprising:
- a first cylinder provided in a hydraulic line, and configured to provide a passage through which oil passes;
- a second cylinder configured to accommodate the first cylinder and to form a resonance chamber between the first cylinder and itself;
- a first coupling member configured to couple a first end of the first cylinder to a first end of the second cylinder; and
- a second coupling member configured to couple a second end of the first cylinder to a second end of the second cylinder;
- wherein the first cylinder has one or more communication holes that allow the passage and the resonance chamber to communicate with each other,
- wherein the diameter of the communication holes is 1.5 millimeters (mm),
- wherein a number n of the communication holes is determined by the following equation:

$$n = \frac{S_t}{s}$$

where $S_t$ denotes a total communication area between the first cylinder and the second cylinder determined by at least a frequency of the noises to be reduced, and s denotes a sectional area of one of the communication holes.

* * * * *